O. E. BYRON.
TRAILER.
APPLICATION FILED APR. 1, 1915.

1,175,046. Patented Mar. 14, 1916.
3 SHEETS—SHEET 1.

Inventor
ORRA E. BYRON

Witnesses
W. K. Ford
James P. Barry

By
Attorneys

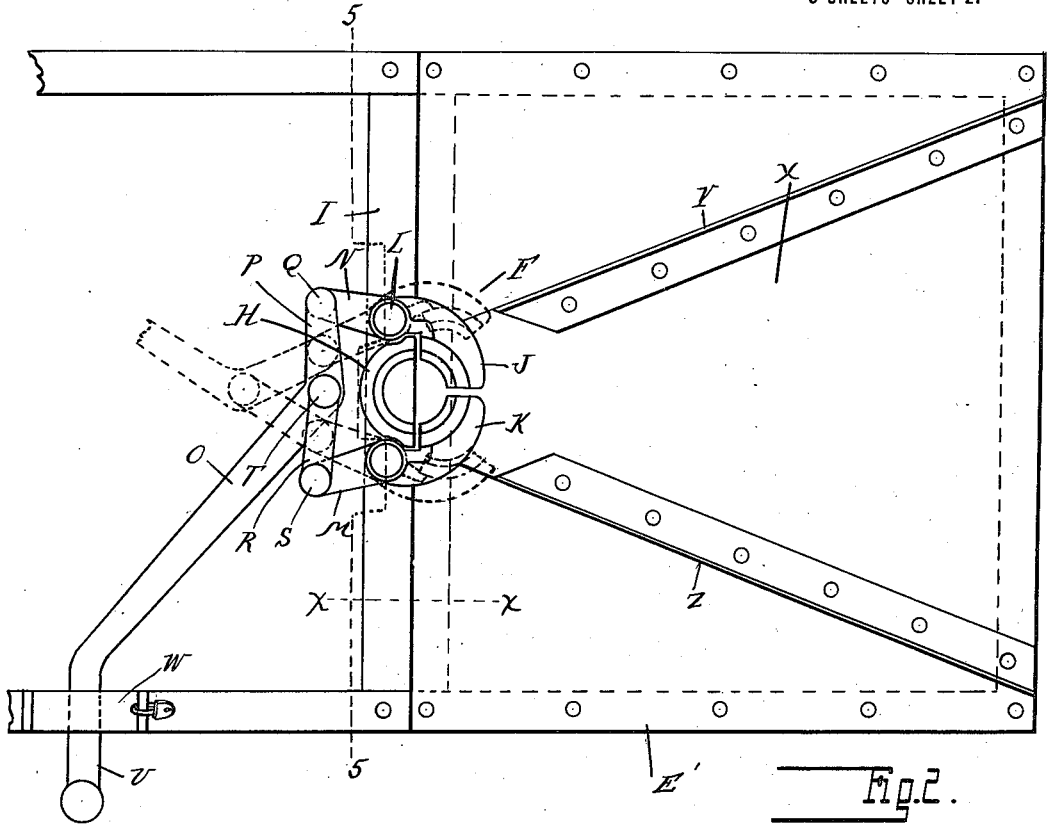
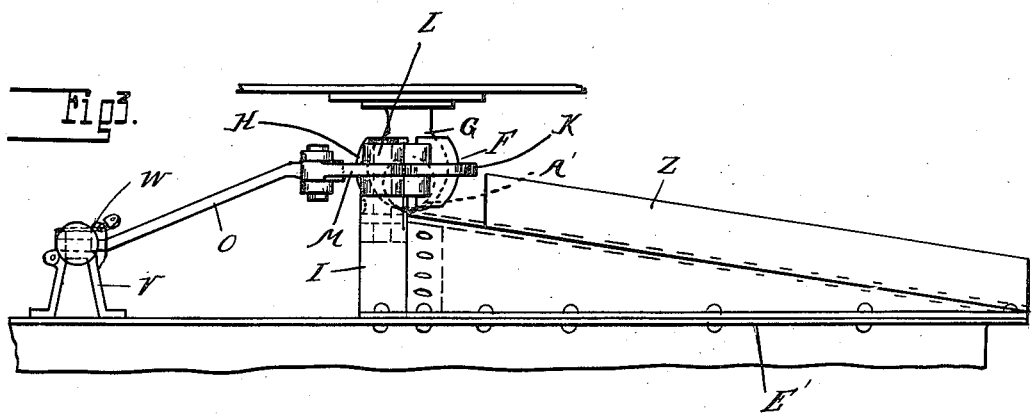

O. E. BYRON.
TRAILER.
APPLICATION FILED APR. 1, 1915.
1,175,046.
Patented Mar. 14, 1916.
3 SHEETS—SHEET 3.
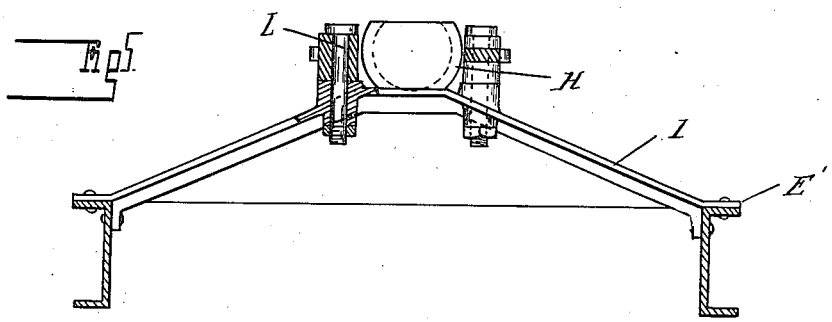
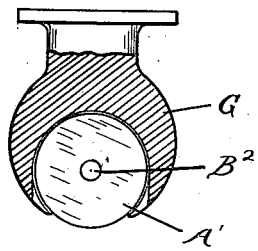
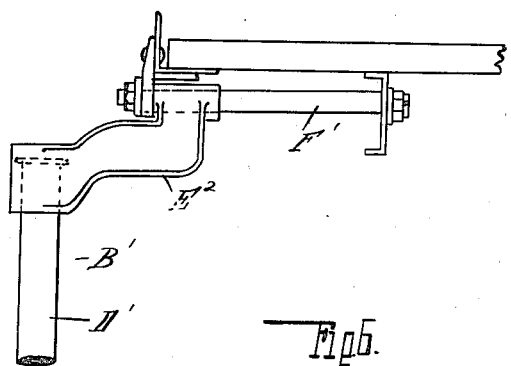
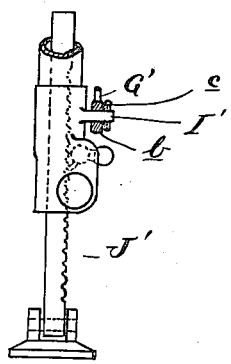
Inventor
ORRA E. BYRON
Witnesses
By
Attorney

UNITED STATES PATENT OFFICE.

ORRA E. BYRON, OF WALKERVILLE, ONTARIO, CANADA, ASSIGNOR TO STEPHEN A. GRIGGS, OF WALKERVILLE, ONTARIO, CANADA.

TRAILER.

1,175,046.  Specification of Letters Patent.  Patented Mar. 14, 1916.

Application filed April 1, 1915. Serial No. 18,482.

*To all whom it may concern:*

Be it known that I, ORRA E. BYRON, a citizen of the United States of America, residing at Walkerville, in the Province of Ontario and Dominion of Canada, have invented certain new and useful Improvements in Trailers, of which the following is a specification, reference being had therein to the accompanying drawings.

The invention relates to trucks, and more particularly to a construction of truck composed of a tractor and a trailer.

The invention resides in the novel combination between the tractor and the trailer; in the novel connection between the tractor and trailer, and further, in certain details of constructions, arrangements and combinations of parts as will more fully hereinafter appear.

Figure 1:
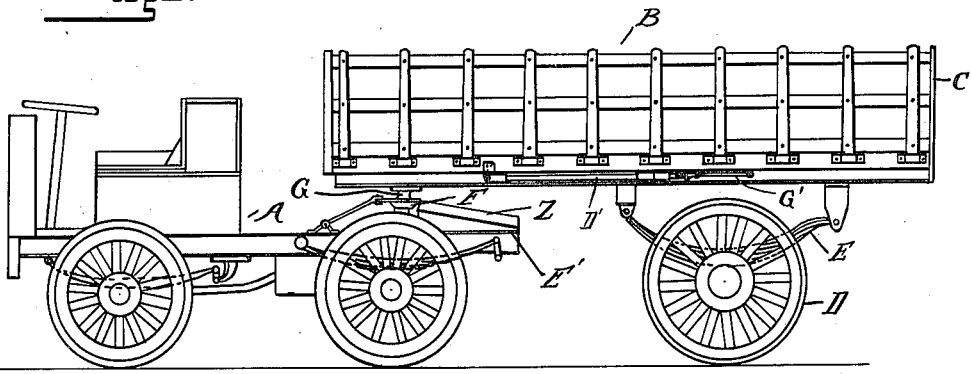
Figure 4:
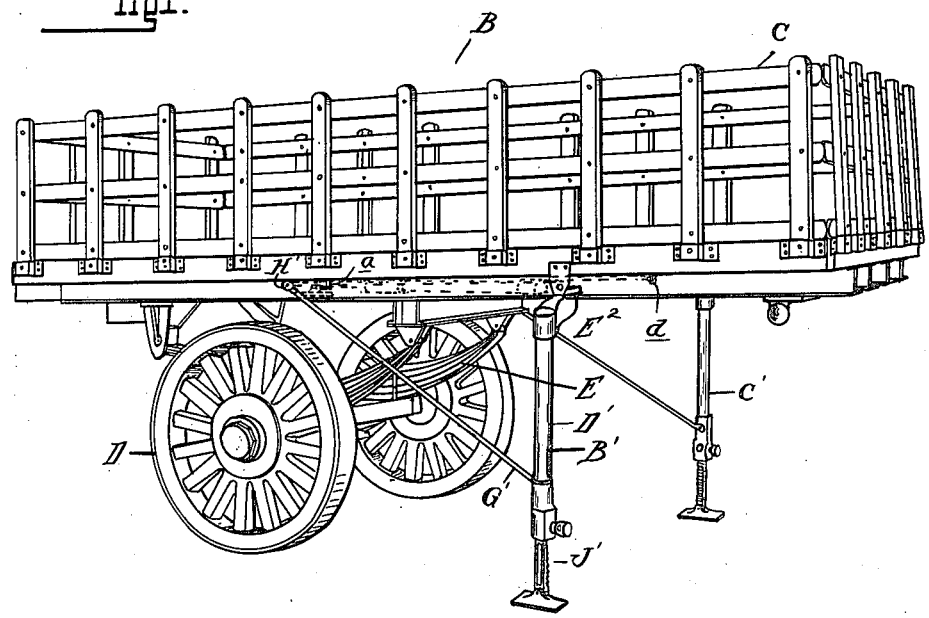

In the drawings,—Figure 1 is a side elevation of a truck embodying the invention; Fig. 2 is an enlarged top plan view of a portion of the tractor; Fig. 3 is an enlarged fragmentary side elevation; Fig. 4 is a perspective view of the trailer detached from the tractor; Fig. 5 is a section on the line 5—5 of Fig. 2; Figs. 6 and 7 illustrate certain details of construction; and Fig. 8 is a section on line x—x of Fig. 2.

A designates the tractor and B the trailer. The tractor A is composed of a suitable motor-driven vehicle, and the trailer B comprises a body portion C mounted upon a pair of wheels D, preferably through the medium of springs E, and connected adjacent its forward end to the tractor so as to be free to turn in relation thereto. With this type of truck it is very desirable to have the connection between the trailer and tractor such as to allow the trailer to be readily connected to or disconnected from the tractor, as such an arrangement—among other advantages—permits one tractor to be used for several trailers, and the latter may be of various sizes. I also find it desirable when the trailer is disconnected, to provide a support for the forward end thereof, which construction is more fully described and claimed in my co-pending application, Serial No. 18,483, filed April 1, 1915.

Referring to the one embodiment of the invention shown in the drawings, the frame E' of the tractor is provided with a socket portion F for receiving a ball G connected to the bottom of the trailer frame C. The socket F is composed of a stationary portion H mounted upon a cross-bar I rigidly secured to the frame E', while the forward portion of the socket is formed by means of jaws J and K pivoted at L to the cross-bar I.

M and N are extensions of the jaws, and O is a lever for actuating these jaws. The lever O has a lateral extension P pivotally connected at Q to the arm N, and R is a link having one end pivoted at S to the extension M and having the other end pivotally connected at T to the lever O. The link R and the portion P form in effect a toggle, and the arrangement is such that when the jaws are closed, the toggle is slightly off center, so that the stress supplied to the jaws by the ball G in the plane of the tractor, will not tend to open the jaws. The lever O is provided also with an outwardly-extending portion U arranged at one side of the frame E' so as to allow the jaws to be released from the side of the frame of the tractor. The portion U is normally arranged within a bracket V and is suitably retained therein by means of a latch W.

I find it exceedingly desirable to permit the coöperating parts of the connection between the tractor and trailer to be readily engaged without first carefully positioning the tractor and trailer in relation to each other, so as to effect an accurate alinement between the coöperating parts. To this end I provide a structure which will guide one of the coöperating parts into engagement with the other in widely different relative positions of the trailer and tractor. Referring more in detail to the particular structure shown in the drawing, extending from the rear of the frame E to the socket is an upwardly-inclined surface X formed by a flat sheet of heavy metal and secured to the sheet as by means of riveting are angle members Y and Z. The forward ends of these members are so arranged that when the jaws J and K are opened, they in effect form a continuation thereof. These angle members diverge so that at the rear they are spaced a distance substantially equal to the width of the frame E. Preferably the sheet metal X is of a size to extend from the cross-bar I rearwardly to the end of the frame E as well as from side to side of the frame. In order to facilitate the travel of the ball G upon the surface X preferably the member G is provided with a roller A' journaled therein on a pin B².

Since the trailer is of the two-wheel type, I find it desirable to provide suitable means for supporting the trailer when detached. In the structure shown, the frame of the tractor is provided adjacent its forward end with legs B' and C'. Each of these legs is formed of a standard D' carried by an arm E² connected to the frame and extending outwardly therefrom. The arms E² extend laterally a sufficient distance to allow the rear end of the truck to readily pass therebetween, and these arms are connected to the frame so as to allow the legs to be folded. Thus as shown, the arm E² has its inner end pivotally connected to a shaft F' extending transversely of the trailer frame and arranged therebeneath. The inner end of the arm E² is not only pivoted upon the shaft F' but also is free to slide longitudinally of the shaft so as to allow the leg to be moved inwardly into the stored position shown in Fig. 4. The outer end of the leg is supported in the stored position by means of a bracket a. G' is a brace rod pivotally connected at H' to the frame of the trailer and having at its forward end an eye b detachably connected to a stud I' on the standard D'. The eye b is retained upon the stud by means of a cotter pin c. When it is desired to fold the leg, the cotter pin is removed and the rod G' turned into the position shown in dotted lines in Fig. 4, so that the eye b may be engaged with a pin d on the frame. In the stored position the rod prevents disengagement of the leg from the bracket a. Preferably the legs B' are each provided with a jack J' so that the height of the legs may be varied.

By the arrangement heretofore described, assuming that the trailer is disconnected and supported as shown in Fig. 4, with the ball G at a height sufficient to pass over the rear end of the frame E, to connect the trailer to the tractor, the jaws J and K are opened and the tractor is backed so that the member G is positioned between the guide bars Y and Z. A further backward movement of the tractor will cause the roller A' of the ball G to ride up the inclined surface X, and during this upward movement the bars Y and Z will guide the ball into proper position relative to the socket portion F, when the jaws J and K may be closed by operating the lever O, which may be retained by means of the latch W. During the engaging of the ball with the socket the legs are relieved of the weight of the trailer, and when the connection has been effected the legs may be readily folded into the stored position. Preferably, though not necessarily, the wheels of the trailer are blocked on the rear side during the coupling of the trailer to the tractor, so as to prevent any tendency for the trailer to move away from the tractor after the legs have been raised off the ground.

To disengage the trailer from the tractor the operator unfolds the legs and attaches the braces thereto, and then moves the lever O to open the jaws J and K. The tractor is then driven forward, and since the base of the socket F is in substantially the plane of the forward edge of the surface X, the ball G will ride out of the socket on the roller R and then down the inclined surface X. Since the surface X is downwardly inclined, the weight of the trailer will be gradually shifted to the legs.

As will be apparent from the foregoing description, with the truck embodying the invention the trailer may be easily and quickly attached to or detached from the tractor, even if the trailer is heavily loaded, and when detached, the trailer is stably supported. Furthermore, the construction of the connection between the tractor and trailer is simple and efficient, while by having this connection in the form of a universal joint, there will be no tendency for the connection to become weakened or broken by torsional or twisting stresses.

While I have shown and described a very desirable and novel form of the invention, I do not wish to limit the protection to the particular structure illustrated.

What I claim as my invention is:—

1. The combination with a tractor, of a two-wheel trailer, a connection between the tractor and trailer, comprising a socket member carried by the one, a ball member carried by the other, means for guiding one of said members into engagement with the other, and a roller carried by the ball and engaging said guide.

2. The combination with a tractor, of a two-wheel trailer and a connection between the tractor and trailer, comprising a socket rigidly attached to the frame of the tractor, a guide leading from the socket rearwardly, and a ball carried by the trailer having a roller journaled therein, said guide being composed of side members converging to the socket and a bottom inclining downwardly from the socket, and means for securing the ball within the socket.

3. The combination with a trailer and a tractor having a frame, of detachably interengaging ball and socket members for coupling the trailer to the tractor, said socket member having a rockable member pivoted to the frame of said tractor and providing entrance to the socket portion, and means operative from the side of the tractor for rocking said rockable member.

4. The combination with a tractor, of a trailer, a socket member upon said tractor having a stationary portion and a rockable portion for forming the socket, a ball member upon said trailer adapted to engage said socket member, and means for rocking said rockable portion of the socket member to retain the ball and socket members in engagement, said means directly locking the rockable portion when in closed position.

5. In the combination of a tractor and a trailer, detachably interengaging ball and socket members for coupling the tractor to the trailer, said socket member being provided with a stationary portion and rockable portions for forming the socket, and a toggle link connection for operating said rockable portions.

6. In the combination of a tractor and a trailer, a socket member upon said tractor having a stationary portion and rockable portions normally forming the socket, a ball member upon said trailer adapted to engage said socket member, a toggle link connection for actuating said rockable portions of the socket member, and means for retaining said rockable portions in closed position.

7. In the combination of a tractor and a trailer, detachably interengaging ball and socket members for coupling the tractor to the trailer, said socket member being provided with a stationary portion and rockable portions for forming the socket, and lever connections for operating said rockable portions directly and positively locking the same in closed position.

8. The combination with a tractor, of a two-wheel trailer and a connection between the tractor and trailer, comprising a socket member on the tractor having movable jaws providing entrance to the socket, guide members in alinement with the respective jaws when open, leading to said socket-member, a ball member carried by the trailer adapted to be guided into engagement with said socket member, and means for operating said jaws.

9. In the combination of a tractor and a trailer, said tractor having a frame and a member secured thereon, detachably interengaging ball and socket members for coupling the tractor to the trailer, said socket member being provided with a stationary portion secured to said member secured to the frame and with a rockable portion pivoted to said member, and means for operating said rockable portion.

10. In the combination of a tractor and a trailer, detachably interengaging ball and socket members for coupling the tractor to the trailer, said socket member having stationary and rockable portions for forming the socket, and a toggle link connection for actuating the rockable portion of the socket member, said connection being slightly off center when the socket is closed to lock the rockable member in closed position.

In testimony whereof I affix my signature in presence of two witnesses.

ORRA E. BYRON.

Witnesses:
JAMES P. BARRY,
ARTHUR D. PULVER.